March 2, 1937.  W. Q. FAULK  2,072,398
KNOCK-DOWN AND ADJUSTABLE TRANSMISSION HOIST
Filed Sept. 29, 1936
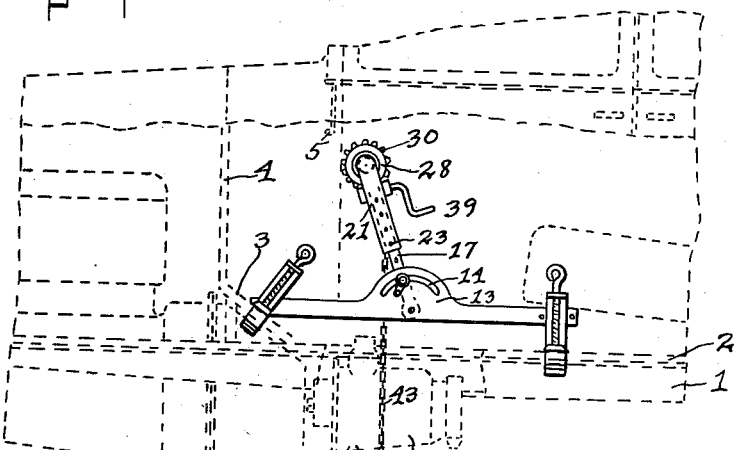
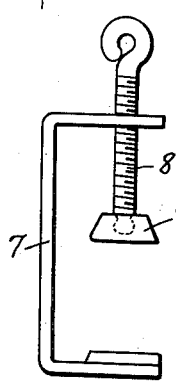
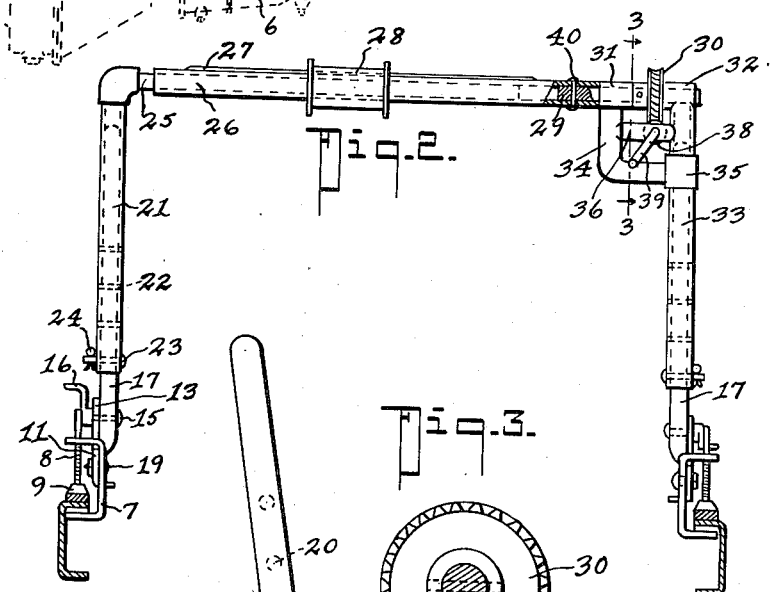
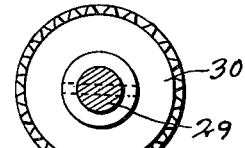
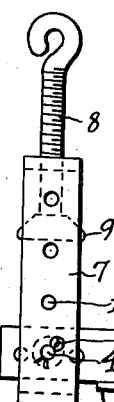
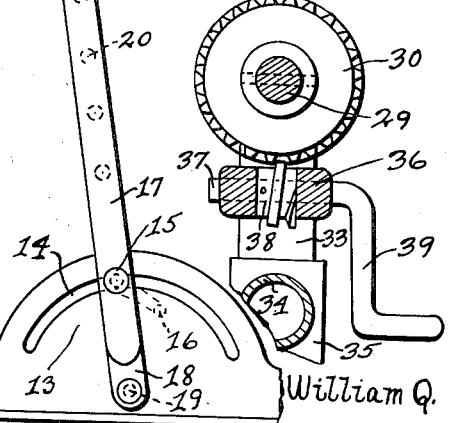
Inventor
William Q. Faulk
By Albert E Dieterich
Attorney Patented Mar. 2, 1937

2,072,398

UNITED STATES PATENT OFFICE 2,072,398

KNOCK-DOWN AND ADJUSTABLE TRANSMISSION HOIST

William Q. Faulk, St. Petersburg, Fla.

Application September 29, 1936, Serial No. 103,196

9 Claims. (Cl. 254—145)

My invention relates to hoists which are particularly intended for use with automobiles to support the transmission mechanism (commonly called "transmission") in removing and replacing the same or to elevate or support to one side the transmission when work is to be done on the clutch or other adjacent parts.

In modern automobile practice but little space is provided between the dash and the seat, which makes it difficult to "lift" the transmission; further, clearance between the stub shafts of the transmission and the adjacent parts to which they couple is often but a fraction of an inch, making it necessary to use extreme care in removing and replacing the transmission so as not to damage the same.

A good transmission hoist must therefor embody the following characteristics, namely, it must, first of all, be fully adjustable, i. e. both longitudinally, transversely and up and down; it must be of a rugged, yet not too cumbersome construction; it must have provisions by which it may be secured rigidly in place on the vehicle; it must be "flexible" enough to fit any car and when necessary it must be capable of being mounted on the inclined frame sills for the toe board and on the longitudinal frame as well.

None of the hoists of the prior art with which I am familiar satisfies all the foregoing requirements and it is an object of my invention to overcome the defects and insufficiencies of the prior art hoists while retaining their beneficial features.

Other objects will in part be obvious and in part be pointed out hereinafter.

To the attainment of the above objects and ends the invention further resides in those novel details of construction, combination and arrangements of parts which will be first described and then be pointed out in the appended claims, reference being made to the accompanying drawing in which:

Figure 1 is a side elevation of my invention, a portion of an automobile being shown in dotted lines and the transmission hoist being shown in full lines.

Figure 2 is an enlarged end elevation of my device, the side frame arms of the vehicle being shown.

Figure 3 is a cross section on the line 3—3 of Figure 2.

Figure 4 is an enlarged detail elevation of one of the longitudinal braces (parts broken away) a clamp member secured thereto, and the angularly adjustable bar carried by the brace.

Figure 5 is an elevation of one of the clamps.

In the drawing, in which like numerals of reference indicate like parts in all of the figures, 1 represents the frame of an automobile, 2 the longitudinal body sills, 3 the inclined sills, 4 the front dash-board, 5 the instrument panel of the dash and 6 the transmission, none of which, per se, are a part of my invention.

The hoist which comprises my invention includes a pair of parallelly disposed longitudinally arranged braces 11, preferably formed of angle iron and to the end of each of which are pivoted clamps for securely mounting the hoist on the vehicle.

Each clamp comprises a U-shaped body 7 having a series of holes 10 for receiving the pivot pin 41 which passes through a similar hole in the brace 11 and which may be held, from accidentally coming out, by a cotter pin 42. Each clamp also includes a screw 8 having a swivelled clamping head 9.

Each brace 11 has a shoulder 12 adjacent each of its clamps to prevent the clamps swinging outwardly. Each also has an arc-plate 13 provided with a curved slot 14 through which a bolt 15 is passed, the bolt 15 having a suitable nut with handle 16.

Each brace 11 is also provided with a rod 17 preferably of tubing, one end of which is flattened at 18 and is pivoted at 19 to the brace. The rods 17 are provided with holes 20 for adjustment purposes and receive the pipes 21 and 33 respectively of the vertically and transversely adjustable bridge which carries the winding drum and its operating mechanism.

The bridge comprises the pipe 21 having pin holes 22 for the pin or bolt 23 which passes also through a hole 20 of one of the bars 17. A cotter pin 24 may be used, if desired, to keep pin 23 from working out.

The pipe 21 has an extension 25 to fit into the hollow cross shaft 26 and serve as a bearing therefor. The shaft 26 has a longitudinal spline 27 and carries the winding drum 28 which turns with the shaft 26 and is slidable along the same (see Figure 2).

A stub shaft 29 is fitted into one end of shaft 26 and is pinned thereto as at 40. The stub shaft rides in bearings 31 and 32 and carries between them a worm wheel 30 that meshes with a worm 38 on a shaft 37 having a crank 39 and journalled in bearings 36 carried by the pipe 33 and the angle pipe 34 which is connected at 35 to pipe 33. It will be seen that the worm gear 38, gear 30 and crank 39 are all located between the side uprights of the apparatus constituted by the pipes 21—33. The pipe 33 is adjustable on its bar 17 similarly to pipe 21.

By pivoting the clamps 7 on the braces 11 they may be mounted with both clamps engaging the frame 1 and sill 2 or one may engage frame 1 and sill 2 while the other engages the inclined sill 3 (see Figure 1).

By means of my invention the position of the winding drum may be located at any desired position, as to height, laterally and forwardly or backwardly.

The clamps 7 having been placed and secured, once the desired location for drum 28 has been determined, the bolts 15 are tightened and a very rigid frame is thereby obtained.

A chain or sling 43 is passed under and around the transmission and wound upon the drum 28; the gearing 30—38 being of the irreversible type will hold the drum in any position around its axis to which it may have been turned.

The provision of the clamps 7 on the ends of the braces 11 and the provisions of the long arcuate slot 14 allows almost an unlimited range of adjustment and permits the location of the braces at the most convenient place within the range of the space, on the vehicle, available for the purpose.

Other advantages of the invention over known prior art structures, such for example as the Fullhart (Patent #1,929,488), the Dice (Patent #1,952,238), the Dickens (Patent #1,864,124), the Beal (Patent #1,806,033), the Moody (Patent #1,915,900), the Jolly (Patent #1,403,962) and the Fow (Patent #1,698,397) will be readily seen by those skilled in the art.

From the foregoing description taken in connection with the accompanying drawing, it is thought the construction, and mode of operation, as well as the advantages of the invention, will be readily understood by those skilled in the art to which it appertains.

What I claim is:

1. A transmission hoist comprising two longitudinal braces, a clamp fastened to each end of the same for securing the braces rigidly to the sides of a vehicle, an upright bar pivoted at its lower end to each brace between the ends thereof, means carried by said braces and bars for rigidly securing the bars at any desired angle to the horizontal, a cross yoke between said bars and including a winding drum and means to operate the same.

2. A transmission hoist comprising two longitudinal braces, a clamp fastened to each end of the same for securing the braces rigidly to the sides of a vehicle, an upright bar pivoted at its lower end to each brace between the ends thereof, means carried by said braces and bars for rigidly securing the bars at any desired angle to the horizontal, a cross yoke between said bars including a winding drum, means to operate the same, said yoke including two upright pipes to fit over the respective upright bars, said pipes and bars having pin receiving holes for the vertical adjustment of said yoke.

3. A transmission hoist comprising two longitudinal braces, a clamp fastened to each end of the same for securing the braces rigidly to the sides of a vehicle, an upright bar pivoted at its lower end to each brace between the ends thereof, means carried by said braces and bars for rigidly securing the bars at any desired angle to the horizontal, a cross yoke between said bars including a winding drum, means to operate the same, and said yoke including telescopic cross members, one of which is rotatable on the other and carries said drum.

4. A transmission hoist comprising two longitudinal braces, a clamp fastened to each end of the same for securing the braces rigidly to the sides of the vehicle, an upright bar pivoted at its lower end to each brace between the ends thereof, means carried by said braces and bars for rigidly securing the bars at any desired angle to the horizontal, a cross yoke between said bars including a winding drum, means to operate the same, said yoke including two upright pipes to fit over the respective upright bars, said pipes and bars having pin receiving holes for the vertical adjustment of said yoke, and said yoke including telescopic cross members, one of which is rotatable on the other and carries said drum.

5. A transmission hoist comprising two longitudinal braces, a clamp fastened to each end of the same for securing the braces rigidly to the sides of a vehicle, an upright bar pivoted at its lower end to each brace between the ends thereof, means carried by said braces and bars for rigidly securing the bars at any desired angle to the horizontal, a cross yoke between said bars including a winding drum, means to operate the same, and means in virtue of which said drum may be adjusted transversely of the vehicle.

6. A transmission hoist comprising two longitudinal braces, a clamp fastened to each end of the same for securing the braces rigidly to the sides of a vehicle, an upright bar pivoted at its lower end to each brace between the ends thereof, means carried by said braces and bars for rigidly securing the bars at any desired angle to the horizontal, a cross yoke between said bars including a winding drum, means to operate the same, said yoke including two upright pipes to fit over the respective upright bars, said pipes and bars having pin receiving holes for the vertical adjustment of said yoke, and means in virtue of which said drum may be adjusted transversely of the vehicle.

7. A transmission hoist comprising two longitudinal braces, a clamp fastened to each end of the same for securing the braces rigidly to the sides of a vehicle, an upright bar pivoted at its lower end to each brace between the ends thereof, means carried by said braces and bars for rigidly securing the bars at any desired angle to the horizontal, a cross yoke between said bars including a winding drum, means to operate the same, said yoke including telescopic cross members, one of which is rotatable on the other and carries said drum, and means in virtue of which said drum may be adjusted transversely of the vehicle.

8. A transmission hoist comprising two longitudinal braces, a clamp fastened to each end of the same for securing the braces rigidly to the sides of the vehicle, an upright bar pivoted at its lower end to each brace between the ends thereof, means carried by said braces and bars for rigidly securing the bars at any desired angle to the horizontal, a cross yoke between said bars including a winding drum, means to operate the same, said yoke including two upright pipes to fit over the respective upright bars, said pipes and bars having pin receiving holes for the vertical adjustment of said yoke, said yoke including telescopic cross members, one of which is rotatable on the other and carries said drum, and means in virtue of which said drum may be adjusted transversely of the vehicle.

9. A transmission hoist comprising two longitudinal braces, a clamp fastened to each end of the same for securing the braces rigidly to the sides of a vehicle, an upright bar pivoted at its lower end to each brace between the ends thereof, means carried by said braces and bars for rigidly securing the bars at any desired angle to the horizontal, a cross yoke between said bars including a winding drum, means to operate the same, said clamps having a vertical series of holes and pins passing through said braces and one of the holes of a series of the respective clamps, adjustably and pivotally to connect the braces and clamps together.

WILLIAM Q. FAULK.